United States Patent [19]
Daams

[11] 3,922,159
[45] Nov. 25, 1975

[54] METHOD OF IMPROVING THE PICKABILITY AND THE RIPENING OF FRUIT, AND PREPARATION FOR USE IN THIS METHOD

[75] Inventor: Jasper Daams, Weesp, Netherlands

[73] Assignee: U.S. Philips Corporation, New York, N.Y.

[22] Filed: June 15, 1973

[21] Appl. No.: 370,381

[30] Foreign Application Priority Data
June 23, 1972 Netherlands .................... 7208611

[52] U.S. Cl. .................................. 71/90; 71/73
[51] Int. Cl.[2] ............................... A01N 9/12
[58] Field of Search ................................. 71/90

[56] References Cited
UNITED STATES PATENTS
3,501,285 3/1970 Baldwin .................................. 71/73
3,536,728 10/1970 Yates et al .......................... 71/90 X OTHER PUBLICATIONS
Neth. Appl. No. 6902637, Chem. Abst., Vol. 73 (1970) 131007n and 8th Collective Formula Index pp. 2326F – under C9 H7 Cl N2O3S.

Primary Examiner—Lewis Gotts
Assistant Examiner—Catherine L. Mills
Attorney, Agent, or Firm—F. R. Trifari; Norman N. Spain

[57] ABSTRACT

The invention relates to method of improving the pickability and ripening of fruit. For this purpose fruit trees, fruit shrubs or fruit are treated with a preparation which contains the substance 4-oxyacetic acid-5-methyl-7-chlorobenzthiadiazole-2,1,3 as the active constituent. This treatment preferably is effected a few weeks prior to harvesting. In particular the treatment of citrus fruit with an aqueous dispersion which contains from 100 to 2000 mg of active substance per liter provides good results. The citrus fruit is readily detached and shows improved ripening, for example an appreciable improvement in color.

3 Claims, No Drawings

METHOD OF IMPROVING THE PICKABILITY AND THE RIPENING OF FRUIT, AND PREPARATION FOR USE IN THIS METHOD

The invention relates to a method of improving the pickability and the ripening of fruit and also to a preparation suitable for use in this method.

Harvesting fruit, such as citrus fruit, olives, peaches, cherries, plums, apples, nuts and berries, is a time consuming and expensive process. In many cases the fruit has to be manually removed from the trees or shrubs one by one. In citrus fruit, such as tangerines, oranges, grapefruit and lemons the adherence of the fruit to the tree is strong, at least from 9 to 10 kg, so that when the ripe fruit are pulled from the trees by hand the likelihood is great that not only the fruit but also parts of the tree, such as branches, are removed. This leads to serious damage of the trees. Hence for this type of fruit the harvesting process used at present consists in that the connection between the fruit and the tree, the stem, is cut through. It will be appreciated that such a procedure requires much work and hence is expensive.

In fruit-growing the degree of ripening of the fruit is of high importance. Ripening of fruit is attended by reduction of the content of chlorophyll and of acid, increase of the sugar content and colouring (pigmentation) of the fruit. Ripening takes place on the tree, but also after picking. The latter ripening is referred to as post-maturation. Unfortunately in several species of fruit the ripening process is irregular or incomplete. In citrus fruit, for example, the pigmentation does not keep pace with the reduction of the acid content and/or the increase of the percentage of sugar. The fruits may be regarded as ripe from the point of view of sweetness, but they still are green. In some cases, especially in citrus fruit, the initial yellow or orange colour disappears, for example during post-maturation, the fruit becoming green again. In order to promote the sweetening of citrus fruit during ripening, citrus trees are sometimes treated with lead arsenate some weeks after blossming.

However, this substance does not influence the pigmentation of the fruit and has the disadvantage of being toxic.

We have now found a method which greatly improves the pickability of fruit and promotes its ripening, such as the pigmentation.

The method according to the invention is characterized in that fruit trees or fruit are treated with a preparation which contains, in addition to an inert carrier material, the compound 4-oxyacetic acid-5-methyl-7-chlorobenzthiadiazole-2,1,3 as the active constituent.

Treating trees, shrubs and fruit by the method according to the invention results in faster and completer ripening of the fruit. Both the sweetness and the pigmentation of the fruit are promoted. This effect is obtained not only in fruit still on the tree or shrub, but also in picked fruit. The method according to the invention also results in a reduction of the adherence of the fruit to the tree or shrub. The values of all these effects depend upon various factors such, for example, as the species of fruit treated, the time at which the treatment is performed, the type of preparation used, the concentration of the active substance in the preparation and the weather conditions.

In general good results are obtained by treating the trees, shrubs or fruit with an aqueous suspension or dispersion of the active substance which contains from 20 to 2000 mg of active substance per liter of the suspension of dispersion. The amount of aqueous dispersion or solution to be used is such that the trees, shrubs or fruit are entirely wetted (run-off).

The time at which the treatment is performed preferably is a few weeks before harvesting.

In particular the treatment of citrus fruit with an aqueous dispersion containing from 100 to 2000 mg of the active substance per liter provides good results. As a result of the method according to the invention citrus fruit may readily be harvested by hand. The stem need not be cut through. Also, the trees are not damaged by the removal of the fruit. In many cases the fruit may be harvested by shaking the trees or shrubs. This opens the prospect of largely mechanizing the harvesting of citrus fruit by the use of shaking machines which may be provided with collecting nets. If the use of the method according to the invention produces a great reduction of the natural adherence between the fruit and the tree or shrub, the fruit will drop from the tree or shrub by its own weight. In such cases, after the treatment by the method according to the invention collecting nets may be placed under the trees or shrubs, so that the work to be done in harvesting is reduced to a minimum.

The active substance which is used in the method according to the invention and may be represented by the following formula

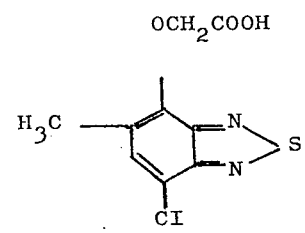

is described in our co-pending Netherlands patent application No. 6,902,637. This Netherlands patent application No. 6,902,637 also states that a group of benzthiadiazole-2,1,3 substances including the aforementioned active substance have biological activity with respect to plants. Many aspects of the biological activity are mentioned, for example antisenescence effects.

The activity described in the present application of the substance 4-oxyacetic acid-5-methyl-7-chlorobenzthiadiazole-2,1,3 with respect to the pickability and the ripening of fruit is a completely novel and surprising biological activity which may readily be used in practice. In this connection it should be noted that this novel activity does not indicate any antisenescence effect as described in the aforementioned Netherlands patent application, but on the contrary indicates an opposite effect.

The invention further relates to a preparation for promoting the pickability and the ripening of fruit which may be used in the aforedescribed method according to the invention.

The preparation according to the invention is characterized in that it contains, in addition to an inert solid or liquid carrier material, the compound 4-oxyacetic acid-5-methyl-7-chlorobenzthiadiazole-2,1,3 as the active constituent.

The preparation according to the invention may be used in different types of formulations which are known and are frequently used in agriculture and horticulture, such as, for example, a wettable powder, a miscible oil, a liquid, an aqueous solution and an aqueous dispersion. The wettable powder, miscible oil and liquid are primary concentrates which are to be diluted with water before use.

In an advantageous primary concentrate according to the invention the active substance is dissolved in dimethylformamide to which a dispersing agent may be added. A highly suitable primary concentrate according to the invention contains from 2 to 20% by weight of the active substance, from 2 to 10% by weight of a dispersing agent, which may for example be a mixture of a polyoxyethyleneglycolether and an alkylarylsulfonate, the remainder being dimethylformamide.

Another advantageous preparation according to the invention is an aqueous solution or dispersion of the active substance which contains from 20 to 2000 mg, preferably from 100 to 2000 mg, of the active substance per liter.

The preparation according to the invention is obtainable by mixing the active substance in a usual manner with a solid or liquid carrier material, if required in the presence of auxiliary substances, such as lubricants and surface-active substances. An aqueous dispersion or solution according to the invention is obtainable, for example, by first producing a primary concentrate, for example of the aforedescribed type, and then adding it to water.

The invention will now be described more fully with reference to an Example.

EXAMPLE.

A primary concentrate was prepared by dissolving 5 parts by weight of 4-oxyacetic acid-5-methyl-7-chlorobenzthiadiazole-2,1,3 and 5 parts by weight of a dispersing agent comprising a mixture of equal parts by weight of polyoxyethyleneglycolether and alkylarylsulfonate in dimethylformamide.

This concentrate was mixed with various amounts of water so as to obtain aqueous solutions and dispersions containing 100, 500 or 2000 mg of the active substance per liter.

Branches of 15 year old orange trees of the species "Valencia", which brances each contained at least 5 oranges, were sprayed with the aqueous dispersions which contained 100 and 500 mg of the active substance respectively. The time of spraying was a few weeks before the harvest. The amount of the aqueous dispersion used was about ½ liter.

After 1 week the adherence to the tree of treated fruit and of untreated fruit was measured. For untreated fruit the adherence was 10.7 kgf. For treated fruit the adherence was 6.3 kgf (100 ppm) and 7.3 kgf (500 ppm). The pigmentation of the treated fruit was much better than that of untreated fruit. The treated branches did not show any phenomena of phytotoxicity. No appreciable leaf drop was found.

The aqueous dispersion which contained 2000 mg of active substance per liter was sprayed on branches of 7 year old orange trees of the species "Valencia". Each tree or tree part treated bore at least 5 oranges. The time of the treatment was a few weeks prior to harvest. Seven days after the treatment the adherence of treated and untreated fruit to the tree was determined. It was 9.4 kgf for untreated fruit and 1 kgf for treated fruit.

No or substantially no phytotoxicity was found. The leaf drop was slight.

What is claimed is:

1. A method of improving the pickability and ripening of fruit said method comprising treating unripened fruit with a preparation containing as the active substance 4-oxyacetic acid-5-methyl-7-chloro-benzthiadiazole-2,1,3, in an amount effective to improve the pickability and ripening of fruit, and a finely divided inert carrier material therefore.

2. The method of claim 1 wherein the preparation is an aqueous solution or dispersion containing from 20 to 2000 mg of the active substance per liter.

3. The method of claim 2 wherein the preparation contains from 100 mg of the active substance per liter.

* * * * *